US008238078B2

(12) United States Patent
Li et al.

(10) Patent No.: US 8,238,078 B2
(45) Date of Patent: Aug. 7, 2012

(54) VALVE METAL PARTICLES UNIFORMLY CONTAINING NITROGEN AND THE METHOD FOR PREPARING THE SAME, THE VALVE METAL GREEN PELLETS AND SINTERED PELLETS, AND THE ELECTROLYTIC CAPACITOR ANODES

(75) Inventors: Bin Li, Shizuishan (CN); Luntao Pan, Shizuishan (CN); Aiguo Zheng, Shizuishan (CN); Yuezhong Ma, Shizuishan (CN); Yuewei Cheng, Shizuishan (CN); Xuecheng Dong, Shizuishan (CN); Xueqing Zhang, Shizuishan (CN); Zhidao Wang, Shizuishan (CN); Baojun Zhu, Shizuishan (CN)

(73) Assignee: Ningxia Orient Tantalum Industry Co., Ltd., Shizuishan, Ningxia (CN)

( * ) Notice: Subject to any disclaimer, the term of this patent is extended or adjusted under 35 U.S.C. 154(b) by 642 days.

(21) Appl. No.: 12/250,627

(22) Filed: Oct. 14, 2008

(65) Prior Publication Data

US 2009/0180240 A1    Jul. 16, 2009

(30) Foreign Application Priority Data

Jan. 11, 2008   (CN) .......................... 2008 1 0002930

(51) Int. Cl.
*H01G 9/042* (2006.01)
*H01G 9/045* (2006.01)
*C23C 8/24* (2006.01)
*C23C 8/48* (2006.01)

(52) U.S. Cl. ......... 361/528; 361/529; 148/238; 148/317

(58) Field of Classification Search .................. 361/523, 361/528, 529; 148/238, 317
See application file for complete search history.

(56) References Cited

U.S. PATENT DOCUMENTS

| | | | | |
|---|---|---|---|---|
| 3,293,507 | A * | 12/1966 | Smith | 361/518 |
| 3,427,132 | A * | 2/1969 | Goon | 423/409 |
| 3,466,508 | A * | 9/1969 | Booe | 361/536 |
| 3,723,838 | A * | 3/1973 | Kumagai | 361/322 |
| 3,828,227 | A * | 8/1974 | Millard et al. | 361/540 |
| 3,970,903 | A * | 7/1976 | Shirn | 361/533 |
| 4,090,288 | A * | 5/1978 | Thompson et al. | 29/25.03 |
| 4,203,194 | A * | 5/1980 | McGrath | 29/25.03 |
| 4,423,004 | A * | 12/1983 | Ross | 29/25.03 |
| 4,544,403 | A * | 10/1985 | Schiele et al. | 420/427 |
| 4,571,664 | A * | 2/1986 | Hyland | 361/540 |
| 4,660,127 | A * | 4/1987 | Gunter | 361/540 |
| 4,791,532 | A * | 12/1988 | Gouvernelle et al. | 361/529 |
| 5,410,445 | A * | 4/1995 | Kanetake | 361/539 |
| 6,238,444 | B1 * | 5/2001 | Cadwallader | 29/25.03 |
| 6,319,292 | B1 * | 11/2001 | Pozdeev-Freeman et al. | 29/25.03 |

(Continued)

*Primary Examiner* — Anatoly Vortman
(74) *Attorney, Agent, or Firm* — Harness, Dickey & Pierce, P.L.C.

(57) ABSTRACT

The present invention relates to valve metal particles uniformly containing nitrogen and a method for preparing the same, and a valve metal green pellet and a sintered pellet made from the particles, and an electrolytic capacitor anode. The present invention provides valve metal particles uniformly containing nitrogen, wherein the difference ratio of nitrogen contents of particles is 20% or less. The present invention provides a process for preparing said valve metal particles uniformly containing nitrogen, wherein the raw material particles of the valve metal were heated in a nitrogen-containing gas at a temperature of 200° C. or less for 2 hours or more. The present invention also provides a valve metal green pellet made from said valve metal particles. The present invention also provides a valve metal sintered pellet.

24 Claims, 2 Drawing Sheets

U.S. PATENT DOCUMENTS

| | | | | |
|---|---|---|---|---|
| 6,432,161 | B1* | 8/2002 | Oda et al. | 75/363 |
| 6,679,934 | B2* | 1/2004 | Rao et al. | 75/245 |
| 6,786,951 | B2* | 9/2004 | He et al. | 75/365 |
| 6,960,237 | B2* | 11/2005 | Naito | 75/255 |
| 6,970,345 | B2* | 11/2005 | Oh et al. | 361/540 |
| 7,066,975 | B2* | 6/2006 | Oda et al. | 75/244 |
| 7,443,653 | B2* | 10/2008 | Kim et al. | 361/523 |
| 7,473,294 | B2* | 1/2009 | Oda et al. | 75/244 |
| 7,570,480 | B2* | 8/2009 | Kim et al. | 361/540 |
| 7,666,247 | B2* | 2/2010 | He et al. | 75/252 |
| 7,727,508 | B2* | 6/2010 | Shi et al. | 423/594.17 |
| 2002/0088507 | A1* | 7/2002 | Rao et al. | 148/422 |
| 2002/0104404 | A1* | 8/2002 | Naito | 75/245 |
| 2003/0218858 | A1* | 11/2003 | Kim et al. | 361/523 |
| 2004/0066607 | A1* | 4/2004 | Edson et al. | 361/528 |
| 2005/0088805 | A1* | 4/2005 | Edson et al. | 361/529 |
| 2006/0260109 | A1* | 11/2006 | Vaisman et al. | 29/25.41 |
| 2006/0262489 | A1* | 11/2006 | Vaisman et al. | 361/540 |
| 2006/0275204 | A1* | 12/2006 | Tagusagawa et al. | 423/594.17 |
| 2007/0068341 | A1* | 3/2007 | Cheng et al. | 75/255 |
| 2007/0279841 | A1* | 12/2007 | Kim et al. | 361/540 |
| 2008/0019081 | A1* | 1/2008 | Kim et al. | 361/535 |
| 2008/0062617 | A1* | 3/2008 | Edson et al. | 361/529 |
| 2008/0080124 | A1* | 4/2008 | Kim et al. | 361/529 |
| 2009/0154065 | A1* | 6/2009 | Choi et al. | 361/523 |
| 2009/0154066 | A1* | 6/2009 | Choi et al. | 361/523 |
| 2009/0154068 | A1* | 6/2009 | Choi et al. | 361/533 |
| 2010/0326239 | A1* | 12/2010 | Shi et al. | 75/369 |

* cited by examiner

FIG.3

VALVE METAL PARTICLES UNIFORMLY CONTAINING NITROGEN AND THE METHOD FOR PREPARING THE SAME, THE VALVE METAL GREEN PELLETS AND SINTERED PELLETS, AND THE ELECTROLYTIC CAPACITOR ANODES

FIELD OF THE INVENTION

The present invention relates to valve metal particles uniformly containing nitrogen and a method for preparing the same, and valve metal green pellets and sintered pellets made from the particles, and electrolytic capacitor anodes.

BACKGROUND OF THE INVENTION

Metal tantalum, niobium are valve metals. An important application of tantalum particle and niobium particle is for manufacturing electrolytic capacitors. As the affinity of tantalum with oxygen is large, a thermal oxide film is always formed on the surface of metal tantalum. Capacitor grade tantalum particle has a large specific surface area and a high oxygen content, especially, the tantalum particle having a specific capacitance higher than 30,000 µF·V/g has a relative high oxygen content. The oxygen content of tantalum sintered pellet for manufacturing electrolytic capacitor is rigorously limited. Owing to that the surface of tantalum particle has a thermal oxide film of 3~8 nanometers thick, the larger of the specific surface area of the tantalum particle, the higher the content of oxygen. In the preparation of the porous tantalum sintered pellet for the capacitor anode, when the oxygen content of tantalum sintered pellet is higher than the limit of solid solubility of oxygen in tantalum (about 2 at %, at T<873 k), a precipitated oxide phase will form on the surface of the sintered pellet. The precipitated oxide phase will precipitate on the amorphous $Ta_2O_5$ film formed when anodizing, which will lead to an electro-crystallization and the formation of nucleus and conducted area. Due to the difference of the density of the amorphous $Ta_2O_5$ and the crystalline $Ta_2O_5$, the crystallization will lead to the cracking of the amorphous $Ta_2O_5$, resulting in the degradation of the performance of the dielectric film and the lowering of the life of the capacitor manufactured with the particles.

If the surface of the tantalum or niobium particle is nitrogen-doped before the formation of the thermal oxide film, the content of oxygen of this particle could be reduced. Also, the doping of the nitrogen has a passivation action, and can reduce the fire risk. Moreover, in the preparation of the capacitor, the nitrogen-doped tantalum particle has a sintering retardant action, so the sintered shrinkage could be reduced, and the porosity could be increased, which is in favor of the impregnation of cathode material, and is in favor of the increasing of the capacitance and the decreasing of the equal series resistance (ESR) of the capacitor. In addition, the nitrogen atom can inhibit the oxygen atom migrating from tantalum oxide film to the tantalum matrix, thereby the tantalum anode containing nitrogen has low electrical leakage and has high rated voltage.

Doping nitrogen for the tantalum powder and doping nitrogen for tantalum anode in the sintering process are an important technique of improving the performance of tantalum powder and tantalum capacitor for the tantalum powder producer and capacitor manufacturer.

Chinese patent application CN 1108036A discloses a process for preparing a capacitor grade powder, electrodes, and finished capacitors there from having reduced electrical leakage characteristics. The powder is prepared by reacting Group V-B base materials with nitrogen of between 500 and 7000 ppm and oxygen of between 700 and 3000 ppm. The process was carried out in a sealed retort in which the mixture of tantalum powder and magnesium was heated up to 900° C. for 3 hours, then cooled to 400° C.~800° C., nitrogen source selected from at least one of nitrogen gas, ammonia or magnesium nitride gas was introduced into the retort.

Chinese patent application CN 1426334A discloses a process of preparing a nitrided valve metals comprising nitriding a valve metal powder at sufficient temperature of 200~350° C. during a heat treatment, that is prior to a deoxidation step.

Due to that the nitriding temperature of the processes above is high, tantalum and niobium react quickly with nitrogen. In addition, since the nitrogen concentration within the reactor is not uniform, thus it is hard to ensure the distribution of nitrogen between different particles to be uniform.

Chinese patent application CN 1433485A provides a process, in which while a metallic compound is reduced with a reducing agent, a nitrogen-containing gas is introduced into a reaction system to thereby form metal, and nitrogen is simultaneously incorporated into the metal. Chinese patent application CN 1872461A discloses a process of manufacturing the metal powder containing nitrogen, in which a metal salt is reduced with a reducing agent and undergoes reduction within a diluent salt, thereby generating the metal, wherein a nitrogen containing gas is introduced into the space containing the reaction melt comprising the metal compound, the reducing agent and the diluent salt, thereby generating the metal and incorporating the nitrogen within the metal. The two nitriding processes are carried out at a temperature of 800° C. or higher. In the process, when the metal compound containing the metal is reduced, the fresh metal atom generated has a strong reactivity with the nitrogen containing gas at the temperature of 800° C. or higher to form metal nitride. In addition, the nitrogen contact only with a part of the metal particles, instead of contacting the whole surface of the metal particles coated with melt salt, so the nitrogen contents between particles are not uniform. Though the following thermal treatment can make some nitrogen uniformly contained within the particle itself and among abut particles, there is a disadvantage on the uniformity of contents of nitrogen among all the particles.

WO 02/04152 A1 disclosed a process comprising a nitrogen treatment step in which a tantalum or niobium powder is heated up to 850° C. with stirring in a rotary kiln in a nitrogenous atmosphere to incorporate nitrogen into the powder. This process is also carried out at high temperature, and thus tantalum nitride is likely to form. Further, this process is complex with a high manufacturing cost. Moreover, the tantalum particles with different nitrogen concentrations have different properties. For instance, the particle having high concentration of nitrogen has high hardness, and the pellet pressed therefrom has low crush strength. It is hard to sinter the tantalum particles of high nitrogen concentration with the tantalum particles of low nitrogen concentration. The pellet pressed with the tantalum particles having different nitrogen concentration has low crush strength. Moreover, the pellet sintered therefrom has low crush strength and the sintered necks thereof are thin or big, resulting in that the capacitor manufactured from this sintered pellet has high electric leakage, poor electric performance.

In order to avoid the above-mentioned problems, it is desired that the nitrogen contents among the valve metal particles are uniform on the whole, and the particles are essentially not containing any nitride; in addition, for preparing the valve metal particles, it is needed a process in which the temperature is low so avoiding fore-mentioned problems due to a high temperature process.

SUMMARY OF THE INVENTION

Taking the problems mentioned above into consideration, an object of the present invention is to provide valve metal particles uniformly containing nitrogen. Another object of the present invention is to provide valve metal particles which are essentially not containing any nitride. Further object of the invention is to provide a process for preparing the valve metal powder having one or more performance said above.

Through following solutions, the present invention realizes the said aims.

In the first embodiment of the invention, it is provided a valve metal particle containing nitrogen uniformly, wherein the difference ratio of the nitrogen contents of particles is 20% or less.

In the second embodiment of the invention, it is provided a process for preparing the valve metal particle containing nitrogen uniformly, wherein the valve metal particle is heated at a temperature of 200 °C. or less in a atmosphere of nitrogen containing gas for 2 hours or more.

In the third embodiment of the invention, it is provided a green pellet pressed from the valve metal particle, wherein the said green pellet has a crush strength of 10~80 N, preferably 15~70 N, more preferably 18~65 N.

DETAILED DESCRIPTION OF THE PRESENT INVENTION

The unit of ppm indicates a part of per million by mass in the present specification, unless otherwise indicated.

As the use in the present application and well known to those skill in the art, when using the mesh to express the size of particle, the "+" or "−" before the mesh value indicates, respectively, that the particle "can not pass" or "can pass" the screen mesh of said mesh value, i.e. the diameter of the particle is "greater than" or "less than" the size of the mesh described. For example, "−80 mesh" indicates the diameter of the particle is "less than 80 mesh", which corresponds to "less than 180 μm", and, accordingly, "+100 mesh" indicates the particle is "greater than 150 μm". Hence, the particles of "−80~+100 mesh" indicate that the particles are "less than 180 μm and greater than 150 μm".

In the embodiment portions, although the specification is for tantalum particle or niobium particle, but as the skill in the art can reasonably expect that, the present invention can be applied to other valve metals, for example, aluminum and vanadium.

According to the present invention, any tantalum powder or niobium powder which was prepared by any known method to those skilled in the art can be used as the raw material. For example, the tantalum or niobium powder that was produced from reduction of a compound containing tantalum or niobium with sodium; the tantalum or niobium powder that was prepared from reduction of tantalum or niobium oxide with metal or metal hydride; or the tantalum or niobium powder which was milled from the hydrogenated metal. According to the present invention, the raw material, that is tantalum or niobium powder, was spherically granulated, heat treated at 850° C.-1700° C. in vacuum, and subsequently cooled to 200° C. or less, and then being nitrogen-doped; alternatively, the heat treated tantalum powder or niobium powder was mixed with magnesium powder and heated at a temperature of 700° C.~1000° C. to deoxidizing, then cooled to 200° C. or less and subsequently being nitrogen-doped, and the product was washed with mineral acid to remove magnesium oxide and residual metal magnesium. The technique known to those skilled in the art can be used in the present invention in obtaining the metal particles as the raw material, and such methods such as those set forth in CN 1023543 C; CN 1068809 C; CN 1073480 C; CN 1069564 C; CN 1169643 C; CN 1278804 C and CN1899730A, and all of these patents are incorporated in their entirely by reference herein.

The valve metal particle, such as tantalum particle or niobium particle can be of any shape, such as nodular, angular, flaked, or any combination thereof. There is not particular limitation of the BET specific surface area of the raw material of the valve metal particles, and it can be, but not limited to, in the range of 0.4 m$^2$/g~10 m$^2$/g, preferably 0.5 m$^2$/g~10 m$^2$/g.

Figure 1:
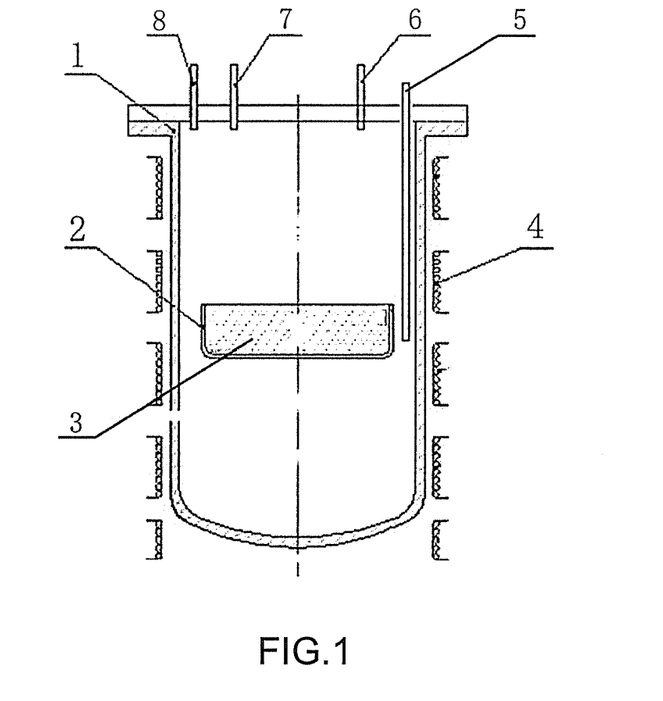
FIG. 1 is a schematic drawing of a reaction retort of nitrogen-doping according to the present invention.

FIG. 1 is a schematic drawing of the nitrogen-doping reactor used in the present invention. The sealed reacting chamber 1 is the reactor used for nitrogen-doping, the valve metal such as tantalum or niobium particles 3 are charged into the tray 2, the electric resistance heating wire 4 heats the reacting chamber 1, the temperature in the reaction chamber is measured with the thermocouple 5. The temperature control system, Eurotherm Controls 2604 (not shown) is connected with a temperature measuring system (not shown). The temperature of the site of the metal particles in the reaction chamber is controlled by the program set up in advance. The vacuum-pipe and vent-pipe 6, as well as inlet pipe 7 for the charging of nitrogen containing gas, and inlet pipe 8 for the charging of an inert gas (e.g. Ar), are located on the cover.

In an embodiment of the present invention, nitrogen-doping can be carried out after removing the thermal oxide film on the surface of the valve metal particles, such as tantalum or niobium particles. The method for removing the thermal oxide film is not particularly limited. For instance, the method for removing the thermal oxide film of tantalum particles could be that, the tantalum particles are heated to above 750° C. in non-oxidation atmosphere, and then cooled in non-oxidation atmosphere to the nitrogen-doping temperature to have nitrogen doped. Alternately, the tantalum particles or niobium particles are heat-treated or deoxidized via Mg reduction, and then cooled in non-oxidation atmosphere to the nitrogen-doping temperature to have nitrogen doped.

In an embodiment of the present invention, the valve metal particles charged into the reaction chamber are tantalum or niobium particles, the nitrogen-doping gas for valve metal particles is nitrogen-containing gas, for example, nitrogen gas. Other examples of nitrogen-containing gas include gases containing pure nitrogen and nitrogen-generating gas which generates nitrogen gas by heating, such as ammonia. If nitrogen gas is used, preferably nitrogen gas with 99.99% purity is used.

When tantalum particles or niobium particles are being nitrogen-doping with nitrogen gas, the pressure of nitrogen gas is 0.1 MPa or more. In the process of nitrogen-doping, if the pressure falls down, a volume of nitrogen gas shall be supplemented to make the pressure achieve the predetermine pressure. High pressure of nitrogen gas ensures sufficient nitrogen gas over the surface of metal. The higher the pressure of nitrogen gas is, the higher the rate of nitrogen gas diffuses. But if the pressure of nitrogen gas is too high, the requirement on the mechanical properties of the chamber will be increased, but the effect of nitrogen-doping will not improve substantially, thereby, considering the cost, too high pressure of nitrogen gas is not preferred. The pressure of nitrogen gas is preferably in a range of 0.10~0.30 MPa, preferably 0.12~0.30 MPa, more preferably 0.12~0.20 MPa. If the other nitrogen-containing gas is used, the pressure of the gas can be of the above ranges.

According to the process of the present invention, the valve metals, such as tantalum or niobium particles are nitrogen doped in a nitrogen-containing gas at a temperature of 200° C.

or lower. Within this temperature range, nitrogen did not react with the valve metals drastically, and nitrides, like $NbN_{0.4-0.5}$, $Nb_2N$, $NbN_{0.8-0.9}$, NbN, $TaN_{0.4-0.5}$, $TaN_{0.8-0.9}$, TaN and so on are essentially not formed. Nitrogen diffuses slowly into the matrix of valve metal at the temperature of 200° C. or lower. The preferred temperature for nitrogen-doping is 120° C. or higher and 200° C. or lower. The heating time is 2 hours or more, preferably 3~12 hours, more preferably 3~10 hours. The deviation from the determined temperature during in the nitrogen-doping process is in the range of ±5° C.

The present invention provides valve metal particles uniformly containing nitrogen, the difference ratio of the nitrogen contents between said valve metal particles is 20% or lower, preferably 10% or lower, and more preferably 8% or lower. In a single particle, the nitrogen concentration distribution within the single valve metal particle can be uniform or not uniform. For instance, the nitrogen concentrations on surface and in the center of a particle can be identical or not. In an embodiment of the present invention, the nitrogen concentration on the surface is higher than the nitrogen concentration in the center, within a single particle.

The valve metal particles provided according to an embodiment of the present invention are tantalum particles. The valve metal particles provided according to another embodiment of the present invention are niobium particles.

Figure 2:
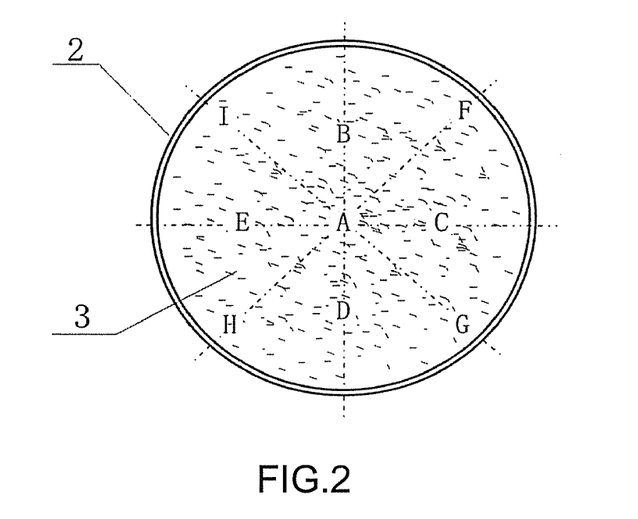
FIG. 2 is a schematic drawing of the sampling positions of the nitrogen-doped example 1, example 2, and example 4.
Figure 3:
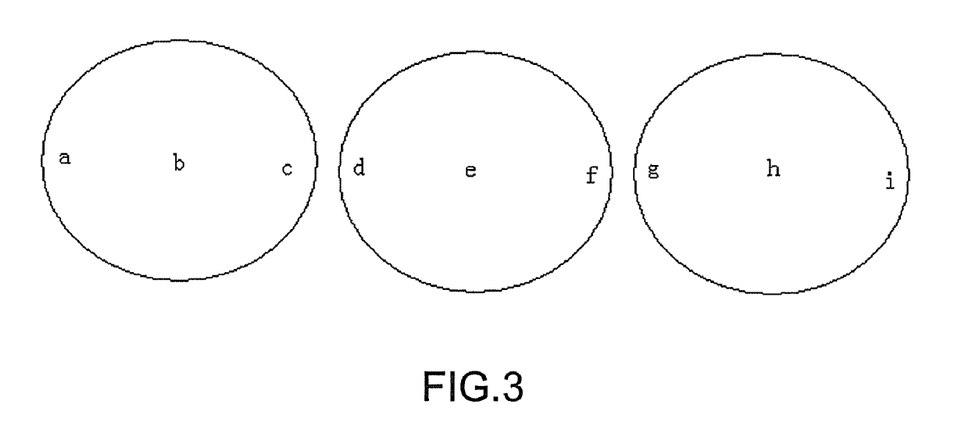
FIG. 3 is a schematic drawing of the sampling positions of the nitrogen-doped example 3 and comparative example 1.

In the application, the difference ratio of the nitrogen contents between the particles indicates the difference ratio of nitrogen contents of the particles at different positions A, B, C, D, E, F, H and I in the crucible as shown in FIG. 2, and the samples are taken before intermixing the nitrogen doped particles in the crucible. The positions A, B, C, D, E, F, G, H and I in FIG. 2 are arranged as follows: A is at the centre of the tray, line BAD and line CAE are perpendicular with each other, the line FAH and line IAG intersect with line BAD at 45°. B, C, D and E are at the middle of the radius of the tray, and F, G, H and I are at the edge of the tray. The samples are taken at the positions of A, B, C, D, E, G, H and I, and the nitrogen content thereof are measured. If the difference ratios of the nitrogen content of these particles at different positions are 20% or lower i. e. the maximum difference ratio of the nitrogen content of the particles is 20% or lower, then the difference ratio of the nitrogen contents between the particles in the same batch of tantalum powder or niobium powder is 20% or lower. The maximum difference ratio of the nitrogen content between the particles is that the value obtained by subtracting the lowest nitrogen content from the highest nitrogen content in samples of A, B, C, D, E, F, G, H and I is divided by the average value of the above nine samples, under the indication of percentage The definition of the difference ratio of the nitrogen content illustrated above is also applicable for the sampling positions in FIG. 3. In FIG. 3, three trays are placed side by side, on a plate in the nitrogen doping reaction chamber. Nine positions are shown in FIG. 3, wherein b, e and h are respectively at the centre of the trays, and the a, c, d, f, g and i are at the edge of the trays.

The nitrogen-doped tantalum particle or niobium particle is optionally leached with inorganic acid, such as sulfuric acid, hydrochloric acid, nitric acid or hydrofluoric acid, in order to remove magnesium oxide and un-reacted magnesium. The oxygen content and nitrogen content of the particles are measured, in which the nitrogen content is in a range of 100 ppm~6000 ppm, preferably 200~5000 ppm, and more preferably 300~4000 ppm, and the oxygen content is in a range of 1000-12000 ppm, preferably 1500-10000 ppm.

In a preferable embodiment, the present invention provides a tantalum particle having a flow rate of at least 2.0 g/sec, preferably 2.3 g/sec.

The present invention provides a tantalum pellet having crush strength of at least 18 N, when 100~150 mg of the above tantalum particles are pressed into a cylinder pellet with a diameter of 3 mm.

The present invention provides a tantalum sintered pellet having a crush strength that is 4 times or more as compared with the crush strength of the green pellet, the sintered pellet is obtained as follows: 100~150 mg of the tantalum particles are pressed in a cylinder pellet with a diameter of 3 mm and the green pellet is sintered at a temperature of 1200~1450° C.

The present invention provides a tantalum anode having a specific capacitance of 30,000~300,000 μF·V/g, and having a electric leakage lower than 0.5 nA/μF·V, the anode is obtained as follows: the tantalum particles are pressed into a pellet having a density of 5.0~7.0 g/cm$^3$, the pellet is sintered at a temperature of 1200~1450° C. for 20~30 minutes to form a sintered pellet, and then the sintered pellet is electrochemically formed into an anode at a voltage of 16~40 V. In the preferable embodiment, the present invention provides a niobium powder having a flow rate of at least of 1.0 g/sec.

The present invention provides anode made from niobium powder having a specific capacitance of 40,000~400,000 μF·V/g, and having a electric leakage lower than 0.8 nA/μF V, the anode is obtained as follows: the niobium particles are pressed into a pellet having a density of 2.5~3.5g/cm$^3$, the pellet is sintered at a temperature of 1100~1300° C. for 20~30 minute to form a sintered pellet, and then the sintered pellet is electrochemically formed into an anode at a voltage of 16~40V.

The data disclosed in the present specification are measured as follows: the nitrogen content of the valve metal particles, such as tantalum or niobium particles is measured by distillation fractionation-Nesslers spectrophotometry; the flowability, BET specific surface area of the powder are measured according to the methods disclosed in the Chinese patent application CN1899730A; The crush strength of the green pellet and the crush strength of the sintered pellet is the average value of 5 samples which were measured as follows: 5 pellets or sintered pellet (cylinder) were placed on the down plate of the computer controlled universal testing machine (CMT8202) so that the axis of the cylinder is in parallel with the upper and lower plate, and pressed in a rate of 2 mm/min; when the pellet was crushed, the compressive force applied is defined the crush strength (N). The wet electrical performance of tantalum or niobium powder was measured as follows: the anode is electrochemically formed in a solution of 0.1 (wt %) $H_3PO_4$ at 80° C., the electric leakage of the anode is tested in a solution of 0.1 (wt %) $H_3PO_4$ at 25° C., the specific capacitance(CV) and the dissipation(tgδ) of the anode are tested in a solution of 20 (wt %) $H_2SO_4$ at 25° C.

EXAMPLES

The present invention will be further illustrated by the following examples, which are intended to be purely exemplary of the present invention.

Example 1

Tantalum particles in amount of 10 kilograms obtained from the reduction of potassium fluorotantalate with sodium was granulated and doped with 70 ppm phosphorous, the granulated particles were subsequently heat treated at 1320° C. for 30 minutes, then the heat treated tantalum particles were screened with an 80 mesh screen to obtain the −80 mesh tantalum particles. The BET specific surface area of the obtained particles is 0.55 m$^2$/g. The tantalum particles obtained above were mixed with 1.5(wt %) of magnesium powder and charged in a tantalum tray, then the tray charged with the mixed powder was placed in a reaction chamber as shown FIG. 1 and sealed. The temperature was raised to 930° C. in vacuum and was hold for 3 hours, then argon gas was filled through inlet pipe 8 to cool particles. After ensuring that the temperature of the charge reached at 130° C. and was stabilized, the reaction chamber was vacuumed to the pressure lower than 100 Pa via vacuum pipe 6, and nitrogen gas was introduced into the reaction chamber so that the pressure thereof reached at 0.12 MPa. The temperature was controlled in the range of 140±5° C. and hold for 4 hours. During temperature holding, the temperature measured by the thermocouple was in the range of 138° C.~143° C., the pressure of the nitrogen gas was in the range of 0.119~0.120 MPa. After holding, the powder was cooled to ambient temperature and taken out. The samples were taken from the 9 positions of A, B, C, D, E, F, G, H and I (FIG. 2). The nitrogen contents of the 9 samples were measured.

The average nitrogen content of the 9 samples in example 1 is 311.7 ppm, in which the highest nitrogen content is 325 ppm, and the lowest nitrogen content is 305 ppm, and the maximum difference ratio of the nitrogen contents between the particles is 6.4. The detail data were listed in table 1.

The tantalum particles was mixed and leached with aqueous solution of nitric acid according to the process known to those skilled in the art, and washed with deionized water to neutral, and then dried. The oxygen and nitrogen contents of the dried tantalum particle were measured, and the data were summarized in Table 1. The flow rate of the tantalum particle is measured, and the result is 5.6 g/sec. The tantalum powder prepared in example 1 was pressed into green pellets in shape of cylinder, each of which had a weight of about 150 mg of powder, diameter of 3 mm and density of 5.5 g/cm³. The crush strength of the green pellet was measured with 5 pellets, and the result is 64.07N. The above green pellet was sintered in a vacuum furnace at about 1450° C. for 20 minutes to form a sintered pellet. The sintered shrinkage of the sintered pellet was measured. The sintered pellet was anodized by holding it in a 0.1 wt % phosphorous acid solution at about 80° C. at 40 V for 2 hours to form an electrolytic capacitor anode with dielectric oxide film. The electric leakage of the anode is tested in a 0.1 wt % phosphorous acid solution at about 25° C., the specific capacitance(CV) and the dissipation(tgδ) of the anode are tested in a 20 wt % sulfuric acid solution at 25° C. The results of sintered shrinkage, the specific capacitance (CV) and the dissipation(tgδ) of the anode were summarized in Table 2.

Example 2

Tantalum powder in amount of 10 kilograms obtained from the reduction of potassium fluorotantalate with sodium was granulated and doped with 80 ppm phosphorous, the granulated particle was subsequently heated at 1200° C. for 30 minute and discharged after cooling, and then the tantalum particle was screened with an 80 mesh screen to obtain the −80 mesh tantalum powder, the BET specific surface area of said −80 mesh tantalum particle is 1.05 m²/g, and the nitrogen content is 60 ppm. The tantalum particle treated above was mixed with 1.8 wt % of magnesium powder and charged in a tantalum tray, then, the tray charged with the mixture powder was placed in a reactor as FIG. 1 and sealed. The powder was heated to about 900° C. at a vacuum level of less than 100 Pa for 3 hours, then argon gas was filled from the inlet pipe 8 to cool the charge, after ensuring that the temperature of the charge reached at 180° C. and was stabilized, the reactor was vacuumed to the pressure lower than 100 Pa by vacuum pipe 6. The nitrogen gas was introduced into the reactor through inlet pipe 7 so as to make the pressure of the reactor reaching at 0.13 MPa. The temperature was controlled in the range of 180±5° C. and hold for 5 hours. The temperature tested by the thermocouple 4 is in the range of 178° C.~183° C., and the pressure in the reactor was kept in the range of 0.128~0.130 MPa. The powder was cooled to ambient temperature and taken out. The samples were taken from the 9 positions of A, B, C, D, E, F, G, H and I (FIG. 2). The nitrogen contents of the 9 samples were measured.

The average nitrogen content of the 9 samples is 431.1 ppm, in which the highest nitrogen content is 445 ppm, and the lowest nitrogen content is 420 ppm, and the difference ratio of nitrogen content among the particles is 5.8. The detail data were listed in table 1.

The tantalum particles was mixed and leached with aqueous solution of nitric acid according to the process known to those skilled in the art, and washed with deionized water to neutral, and then dried. The oxygen and nitrogen contents of the dried tantalum particle were measured, and the data were summarized in Table 1. The flow rate of the tantalum particle is 5.6 g/sec.

The tantalum powder prepared in example 2 was pressed into green pellets in shape of cylinder, each of which had a weight of about 150 mg of powder, diameter of 3 mm and density of 5.0 g/cm³. The crush strength of the green pellet was measured with 5 pellets, and the result is 40.18N. The above green pellet was sintered in a vacuum furnace at about 1300° C. for 30 minutes to form a sintered pellet. The sintered shrinkage of the sintered pellet was measured. The sintered pellet was anodized by holding it in a 0.1 wt % phosphorous acid solution at about 80° C. at 40 V for 2 hours to form an electrolytic capacitor anode with dielectric oxide film. The electric leakage of the anode is tested in a 0.1 wt % phosphorous acid solution at about 25° C., the specific capacitance (CV) and the dissipation(tgδ) of the anode are tested in a 20 wt % sulfuric acid solution at 25° C. The results of sintered shrinkage, the specific capacitance(CV) and the dissipation (tgδ) of the anode were summarized in Table 2.

Example 3

Tantalum powder in amount of 12 kilograms obtained from the reduction of potassium fluorotantalate with sodium was granulated and doped with 120 ppm phosphorous. The granulated particles in amount of 6 kilograms was transferred into three trays, and the trays containing the particles were put into a vacuum heat treatment furnace on a plate side by side to heated at about 1120° C. for 30 minute, then the heated tantalum particle was cooled to 190° C. in argon gas, then the furnace was vacuumed to the pressure of 13.3 Pa, then the pure nitrogen gas was introduced into the furnace in which the pressure was reached 0.17 MPa, the temperature of the furnace is controlled in the range of 188~195° C. and held for 7 hours, the pressure in the reactor was in the range of 0.168~0.170 MPa, and then the powder was cooled in argon gas to ambient temperature and passivated, and then was taken out. The samples were taken from 9 positions of a, b, c, d, e, f, g, h and I (FIG. 3). The nitrogen contents of the 9 samples were measured; the results were listed in Table 1.

The average nitrogen content of the 9 samples in Example 3 is 2050 ppm, in which the highest nitrogen content is 2120 ppm, and the lowest nitrogen content is 1960 ppm, and the difference ratio of the nitrogen content among the particles is 7.8. The detail was listed in Table 1.

The tantalum particles in the three trays were mixed. The BET specific surface area of the mixed powder was 3.41 m²/g. The tantalum particle were mixed with 2.5wt % magnesium powder and heated at about 800° C. to deoxidize, and then leached with aqueous solution of nitric acid according to the process known to those skill in the art, and water washed to neutral, and then dried. The oxygen and nitrogen contents of the dried tantalum particle were measured, and the data were summarized in Table 1. The flow rate of the tantalum particle is 2.5 g/sec. The tantalum powder prepared above was pressed into 20 pellets in shape of cylinder, each of which had a weight of about 100 mg of powder, a diameter of 3mm and a density of 5.0 g/cm³. The crush strength of the green pellet was measured with 5 pellets, and the average content is calculated. The result was listed in Table 3. The remainder 15 pellets were sintered in a vacuum furnace at about 1200° C. for 20 minutes to form sintered pellets. The sintered shrinkage of the sintered pellet was tested. The crush strength of the sintered pellets was measured with 5 pellets. The results were listed in Table 3. In example 3, the crush strength of green pellet is 19.68N, and the crush strength of the sintered pellet was 79.91N, that was 4.06 times of the crush strength of green pellet. The remainder 10 pellets were anodized by holding in a 0.1 wt % phosphorous acid solution at about 80° C., at 20 V for 2 hours to form electrolytic capacitor anodes. The results of sintered shrinkage, the specific capacitance(CV) and the dissipation(tgδ) of the anode were measured and summarized in Table 2.

Comparative Example 1

The granulated tantalum in amount of 6 kilograms powder in example 3 was heated according the condition of example 3. When the heat treatment is completed, the charged tantalum powder was cooled to 350° C. in argon gas, and then the furnace was vacuumed to the pressure of 13.3 Pa, then the pure nitrogen gas was introduced into the furnace in which the pressure was reached 0.01 MPa, and the argon gas was filled to the pressure of 0.11 MPa. The temperature of the furnace went up from 350° C. to 410° C. in an hour, and then the powder was cooled in argon gas to ambient temperature and passivated, and then was taken out. The samples were taken from 9 positions of a, b, c, d, e, f, g, h and I (FIG. 3). The nitrogen contents of the 9 samples were measured, the results were listed in Table 1.

The average nitrogen content of the 9 samples in comparative example 1 is 2487 ppm, in which the highest nitrogen content is 3850 ppm, and the lowest nitrogen content is 1860 ppm, and the difference ratio of the nitrogen content among the particles is 80. The detail was listed in Table 1.

The tantalum particles of comparative examples 1 in three trays were mixed. The BET specific surface area of the mixed powder was 3.45 m²/g. The tantalum particle was magnesium deoxidized as example 3. The oxygen and nitrogen contents of the tantalum particle were measured, and the data are summarized in Table 1. The flow rate of the tantalum particle is 2.4 g/sec.

The crush strength of the green pellet and sintered pellet were measured as example 3, and the results are listed in Table 3. The electrical properties were measured as example 3, and the results were listed in table 2.

Comparing the data of the sample 3 and comparative example 1 in Table 2 and Table 3, it can be seen that the tantalum particle of comparative example 1 with nitrogen contained not uniformly, has higher oxygen content, lower green pellet crush strength, lower sintered pellet crush strength than the example 3. The crush strength of the sintered pellet is 3.43 times of the crush strength of green pellet. The electric leakage of the example 3 is lower than the comparative example 3.

Example 4

The niobium powder in amount of 5 kilograms of obtained from the thermal reduction of niobium oxide with reducing metal was granulated and heat treated. The heated niobium particle has a BET specific surface area of 5.82 m²/g, and the nitrogen content is 60 ppm. The niobium particle treated above was mixed with 2.5 wt % of magnesium powder and charged into a niobium tray, then the tray charged with the mixture powder was placed in a reactor as FIG. 1 and sealed. The powder was heated to about 800° C. at a vacuum level of less than 100 Pa for 3 hours, then argon gas was filled from the inlet pipe 8 to cool the charge. After ensuring that the temperature of the charge reached at 190° C. and was stabilized, the reactor was vacuumed to the pressure lower than 100 Pa, and then the nitrogen gas was introduced into the reactor through inlet pipe 7 so as to make the pressure of the reactor reaching 0.18 MPa. The temperature of the charge is controlled in the range of 190±5° C. and held for 9 hours. The temperature tested by the thermocouple 4 is in the range of 189° C.~195° C., the nitrogen pressure in the reactor was in the range of 0.178~0.180 MPa. Then, the powder was cooled to ambient temperature and taken out. The samples were taken from 9 positions of A, B, C, D, E, F, G, H and I (FIG. 2). The nitrogen contents of the 9 samples were measured. The results were listed in table 1.

The average nitrogen content of the 9 samples in Example 4 is 3195 ppm, in which the highest nitrogen content is 3280 ppm, and the lowest nitrogen content is 3100 ppm, and the difference ratio of nitrogen content among the particles is 5.6

The niobium particles was mixed and leached with aqueous solution of nitric acid according to the process known to those skilled in the art, and washed with deionized water to neutral, and then dried. The oxygen and nitrogen contents of the dried niobium particle were measured, and the data were summarized in Table 1. The flow rate of the niobium particle is 2.5 g/sec.

The niobium powder prepared in example 4 was pressed into green pellets in shape of cylinder, each of which had a weight of about 100 mg of powder, and density of 3.0 g/cm³. The crush strength of the green pellet was measured with 5 pellets, and the result is 33.05N. The above green pellet was sintered in a vacuum furnace at about 1150° C. for 20 minutes to form a sintered pellet. The sintered shrinkage of the sintered pellet was measured. The sintered pellet was anodized by holding it in a 0.1 wt % phosphorous acid solution at about 80° C. at 20 V for 2 hours to form an electrolytic capacitor anode with dielectric oxide film. The electric leakage of the anode is tested in a 0.1 wt % phosphorous acid solution at about 25° C., the specific capacitance(CV) and the dissipation (tgδ) of the anode are tested in a 20 wt % sulfuric acid solution at 25° C. The results of sintered shrinkage, the specific capacitance(CV) and the dissipation(tgδ) of the anode were summarized in Table 2.

TABLE 1

N contents of tantalum powder or niobium powder after nitrogen doping, and O, N contents after leaching (ppm)

|  | N | | | | | | | | | | O, N (after leaching) | |
| --- | --- | --- | --- | --- | --- | --- | --- | --- | --- | --- | --- | --- |
|  | A(a) | B(b) | C(c) | D(d) | E(e) | F(f) | G(g) | H(h) | I(i) | average | O | N |
| Example1 | 310 | 305 | 305 | 320 | 325 | 315 | 315 | 305 | 310 | 312.2 | 1800 | 305 |
| Example 2 | 445 | 435 | 440 | 425 | 430 | 425 | 435 | 425 | 420 | 431.1 | 3020 | 425 |

TABLE 1-continued

N contents of tantalum powder or niobium powder after nitrogen doping, and O, N contents after leaching (ppm)

| | N | | | | | | | | | | O, N (after leaching) | |
|---|---|---|---|---|---|---|---|---|---|---|---|---|
| | A(a) | B(b) | C(c) | D(d) | E(e) | F(f) | G(g) | H(h) | I(i) | average | O | N |
| Example 3 | 2100 | 2050 | 2080 | 2120 | 2030 | 1990 | 2050 | 2070 | 1960 | 2050 | 8150 | 1980 |
| Comparative Example1 | 1950 | 1860 | 2010 | 3510 | 3850 | 3560 | 1860 | 1900 | 1880 | 2487 | 8560 | 2460 |
| Example 4 | 3200 | 3190 | 3240 | 3160 | 3100 | 3280 | 3240 | 3160 | 3190 | 3196 | 9150 | 3050 |

TABLE 2

Electric performance of tantalum anode or niobium anode with different N content

| | CV | DCL | | Shrinkage (%) | |
|---|---|---|---|---|---|
| | μFV/g | nA/μFV | tg δ % | Diameter | Volume |
| Example 1 | 35240 | 0.17 | 16.5 | 5.6 | 14.0 |
| Example 2 | 71000 | 0.15 | 27.1 | 2.2 | 7.8 |
| Example 3 | 151000 | 0.31 | 62.1 | 1.5 | 4.10 |
| Comparative Example 1 | 150630 | 0.52 | 65.3 | 1.3 | 3.46 |
| Example 4 | 125200 | 0.70 | 79.5 | 1.7 | 4.9 |

TABLE 3

The crush strengths of the green pellets and sintered pellets of the tantalum powder

| | Green pellet (N) | Sintered pellet (N) | Sintered pellet/ green pellet |
|---|---|---|---|
| Example 3 | 19.68 | 79.91 | 4.06 |
| Comparative Example 1 | 16.92 | 58.08 | 3.43 |

As described hereinabove, the tantalum particle or niobium particle prepared according to the process of the present invention has uniform distribution of nitrogen, both the green pellet and sintered pellet made from the particle of the present invention have high crush strength, and the electric property was improved.

While there has been shown and described what are at the present considered the preferred embodiments of the invention, it will be obvious to those skilled in the art that various changes and modifications may be made therein without departing from the scope of the invention as defined by the appended claims.

The invention claimed is:

1. A tray of valve metal particles, wherein each metal particle comprises:
a base metal;
nitrogen uniformly contained within the base metal; wherein
a difference of a ratio of nitrogen content among valve metal particles positioned at nine sampling positions of the valve metal particles in the tray is equal to or less than 20%;
a first one of the nine sampling positions is taken from a center of the tray of metal particles, four of the nine sampling positions are taken from an outside edge of the tray in a plan view of the tray and four samples are taken from positions between the center and the outside edge of the tray in the plan view.

2. The valve metal particles of claim 1, wherein said difference of the ratio of nitrogen content of the valve metal particles is 15% or less, preferably 10% or less, and more preferably 8% or less.

3. The valve metal particles of claim 1, wherein the nitrogen content is 100 ppm~6000 ppm, preferably 200~5000 ppm, and more preferably 300~4000 ppm.

4. The valve metal particles of claim 1, wherein said base metal of said valve metal particles is tantalum.

5. The valve metal particles of claim 1, wherein said base metal of said valve metal particles is niobium.

6. A valve metal green pellet made from the valve metal particles according to claim 1, wherein said green pellet has a crush strength of 10~80 N, preferably 15~70 N, and more preferably 18~65 N.

7. The valve metal green pellet of claim 6, wherein said pellet is made from tantalum particles, and has a green density of 5.0~7.0 g/cm³, preferably 5.0~6.0 g/cm³, and more preferably 5.0~5.5 g/cm³.

8. The valve metal green pellet of claim 6, wherein said pellet is made from niobium particles, and has a green density of 2.5~3.5 g/cm³.

9. A valve metal sintered pellet made from the valve metal green pellet according to claim 6, wherein said pellet after being sintered has a crush strength of 4 times or more than a crush strength of the green pellet.

10. An anode for dielectric capacitor, wherein said anode is formed from the valve metal sintered pellet of claim 9.

11. The anode of claim 10, wherein said anode is a tantalum anode, and has a specific capacitance of 30,000~300,000 μF·V/g, and has a electrical leakage of 0.5 nA/μF·V or less.

12. The anode of claim 11, wherein said anode has a specific capacitance of 30,000~250,000 μF·V/g, and preferably 30,000~200,000 μF·V/g.

13. The anode of claim 11, wherein said anode has a electrical leakage of 0.4 nA/μF·V or less, and preferably 0.35 nA/μF·V or less.

14. The anode of claim 10, wherein said anode is a niobium anode, and has a specific capacitance of 40,000~400,000 μF·V/g, and has an electrical leakage of 0.8 nA/μF·V or less.

15. The anode of claim 14, wherein said anode has a specific capacitance of 60,000~300,000 μF·V/g, preferably 80,000~200,000 μF·V/g, and more preferably 100,000~150,000 μF·V/g.

16. The valve metal particles of claim 1, wherein each of four sampling positions taken from the outside edge of the tray are spaced approximately 90° from an adjacent sampling position taken from the outside edge of the tray in a circumferential direction.

17. The valve metal particles of claim 16, wherein each of the four sampling positions taken from the positions between the center and the outside edge of the tray are spaced approximately 90° from an adjacent sampling position taken between the center and outside edge of the tray in the circumferential direction and approximately 45° from an adjacent sampling position taken from the outside edge of the tray in the circumferential direction.

18. A process for preparing the valve metal particles uniformly containing nitrogen according to claim 1, wherein the valve metal particles are heated at a temperature of 200° C. or less in an atmosphere of nitrogen containing gas for 2 hours or more.

19. The process of claim 18, wherein said nitrogen containing gas includes pure nitrogen gas and/or nitrogen-generating gas which can generate nitrogen gas by heating.

20. The process of claim 18, wherein pressure of the said nitrogen containing gas is 0.10 MPa or more.

21. The process of claim 20, wherein the pressure of said nitrogen containing gas is 0.10~0.30 MPa, preferably 0.12~0.30 MPa, and more preferably 0.12~0.20 MPa.

22. The process of claim 18, wherein the valve metal particles are heated at a temperature range of 120-200° C.

23. The process of claim 18, wherein the valve metal particles are heated for 3~12 hours, preferably 3~10 hours.

24. The process of claim 18, wherein a drift of temperature is in a range of ±5° C. during heating.

* * * * *